Feb. 16, 1932.  H. H. CUTLER  1,845,245
INTERNAL COMBUSTION ENGINE
Filed Sept. 29, 1928  6 Sheets-Sheet 3

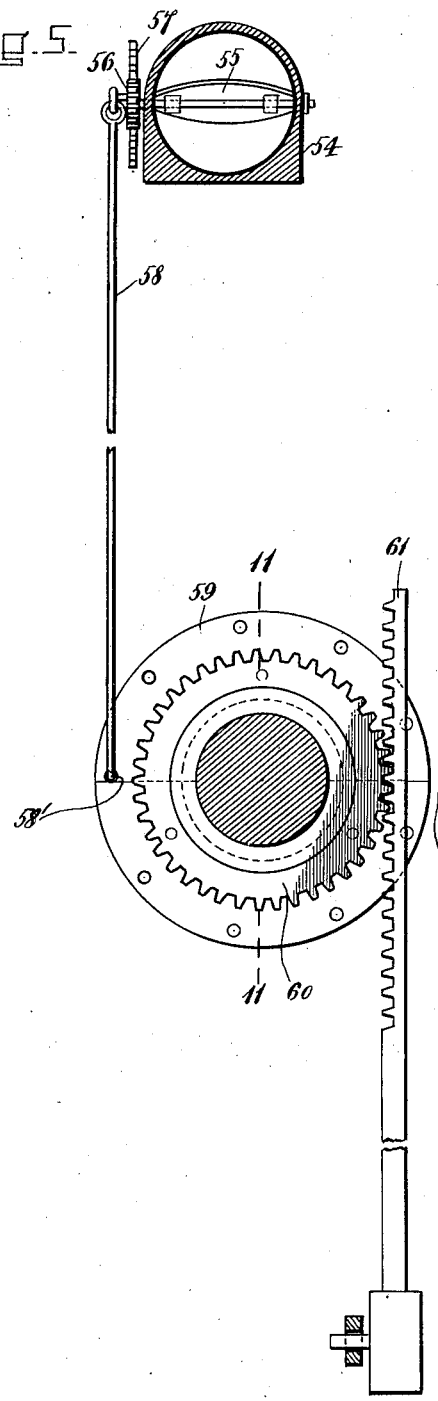
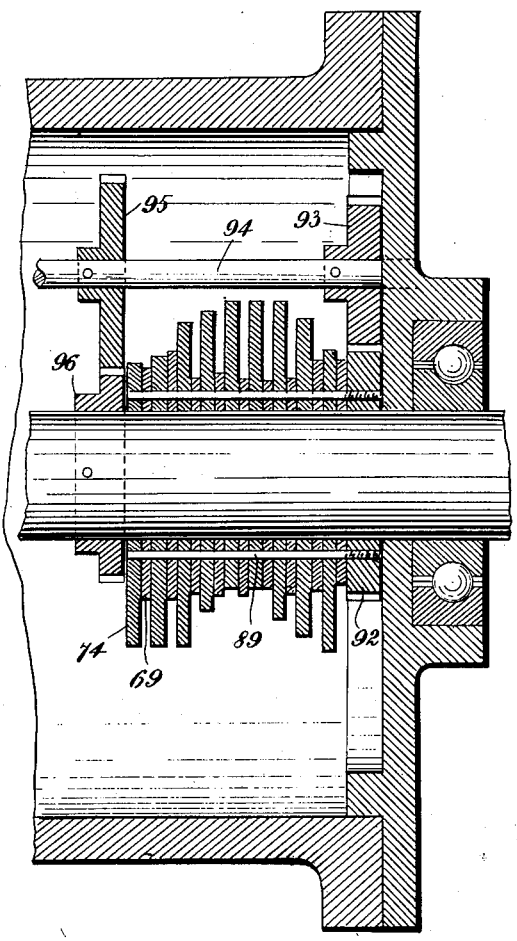

Feb. 16, 1932. H. H. CUTLER 1,845,245
INTERNAL COMBUSTION ENGINE
Filed Sept. 29, 1928 6 Sheets-Sheet 6
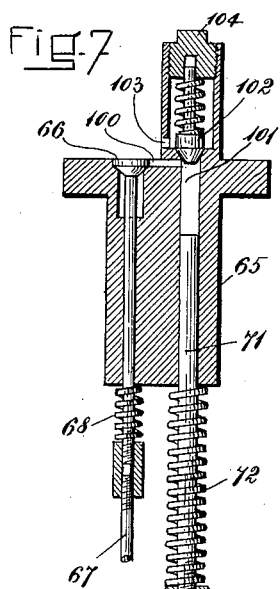
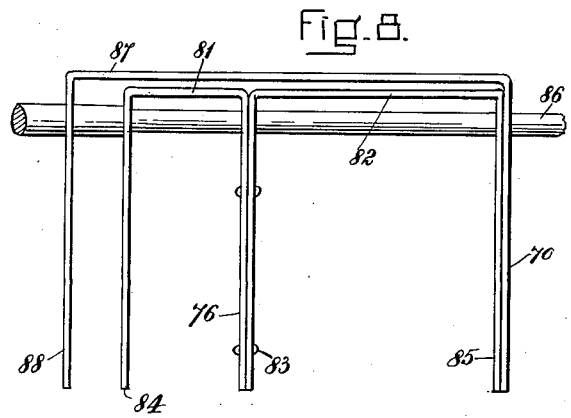
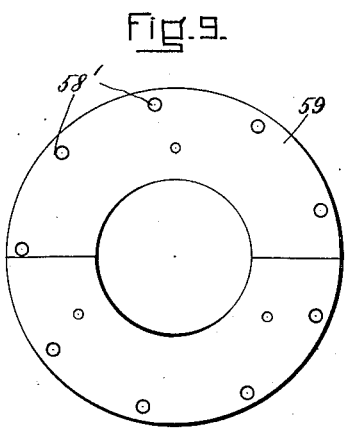
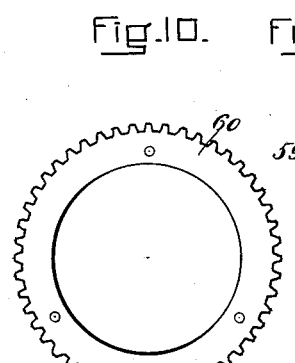
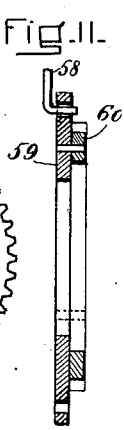
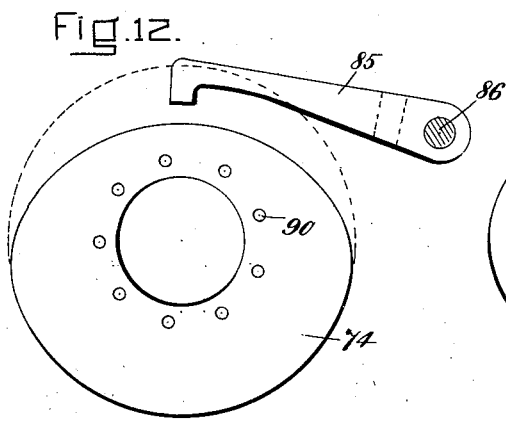
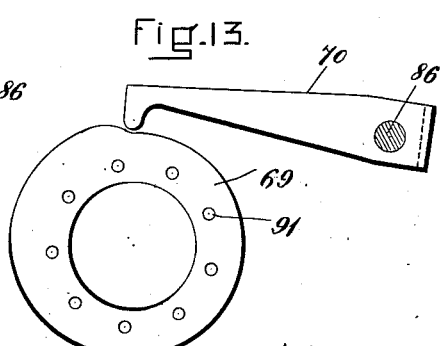

Patented Feb. 16, 1932

1,845,245

UNITED STATES PATENT OFFICE

HENRY H. CUTLER, OF BROOKLINE, MASSACHUSETTS

INTERNAL COMBUSTION ENGINE

Application filed September 29, 1928. Serial No. 309,180.

My invention relates to internal combustion engines and particularly to such engines for use in flying machines.

The general object of my invention is to provide means for mechanically supplying liquid fuel and air to an airplane engine without the use of a carburetor, such means involving the maintenance of synchronism between a mechanically-created influx of air and a mechanically-created influx of fuel whereby the ratio of the rate of such influx of liquid fuel to the rate of the influx of air of combustion flowing into the cylinder when the air intake valve is open is maintained approximately constant when the engine is under load.

Other objects of my invention are to provide means for clearing the engine cylinders of inert gas, means for increasing the pressure of the influx of air of combustion, and means whereby the intake valve of the cylinder is maintained at its maximum opening for a relatively large part of a crank shaft revolution; to provide means for actuating the fuel pump on its delivery stroke in synchronism with the power piston of the engine during the first portion of the intake stroke of said power piston, and other means for completing said delivery stroke during the remaining portion of said intake stroke and a portion of the compression stroke of the power piston, and for holding said plunger at the end of its delivery stroke during the remaining portion of the compression stroke of the power piston and during the entire power stroke thereof.

Other objects of my invention will hereinafter appear in the particular description of the mechanism illustrated to explain the principle underlying the same.

With the foregoing objects in view, my invention comprises an internal combustion engine provided with a mechanically-driven fuel pump, and mechanism for actuating the plunger of the same in such manner that the influx of liquid fuel is synchronized with the influx of the air of combustion and for maintaining practically constant the ratio of the rate of such influx of liquid fuel to the rate of the influx of the air of combustion when the air intake valve is open while the engine is under load.

My invention comprises also means whereby the air of combustion is blown into each cylinder from a time shortly prior to the end of the scavening stroke of the power piston to shortly after the beginning of the intake stroke thereof whereby the mechanical scavenging of the cylinder is supplemented and made more complete by pneumatic scavenging; and also means whereby the air of combustion is blown into the engine cylinders during the intake stroke of the power piston under considerable pressure, instead of being merely sucked in at atmospheric pressure by the movement of the power piston.

My invention further comprises manually-actuated means for varying the volume of liquid fuel and also the influx of the air of combustion in accordance with the load on the engine.

My invention comprises also an arrangement of cams for actuating and controlling the fuel pump, one cam effecting the first portion of the delivery stroke of said pump in synchronism with the intake stroke of the power piston, another cam completing such delivery stroke in substantial accordance with the rate of speed of the air influx and then holding the pump plunger at the end of said stroke during the remaining portion of the compression stroke of the power piston and during the entire power stroke of the latter, and a third cam closing the intake port of said pump plunger during the delivery stroke thereof.

My invention may best be understood by having reference to the drawings accompanying and forming a part of this specification in which—

Fig. 5 is an elevation on an enlarged scale of the air intake valve control;

Fig. 6 is a vertical section on an enlarged scale of the cams and actuating means therefor, whereby the fuel pump is regulated and controlled;

Fig. 7 is a vertical section on an enlarged scale of the fuel pump;

Fig. 8 is a plan view on an enlarged scale of the tappet arms whereby the fuel pump is actuated and controlled;

Figs. 9 and 10 are plan views of details of construction;

Fig. 11 is a section taken on the line 11—11 of Fig. 5;

Fig. 12 is an elevation of one of the cams whereby the stroke of the pump plunger is controlled; and Fig. 13 is a similar view of one of the cams whereby the intake valve of the fuel pump is regulated.

Figure 2:
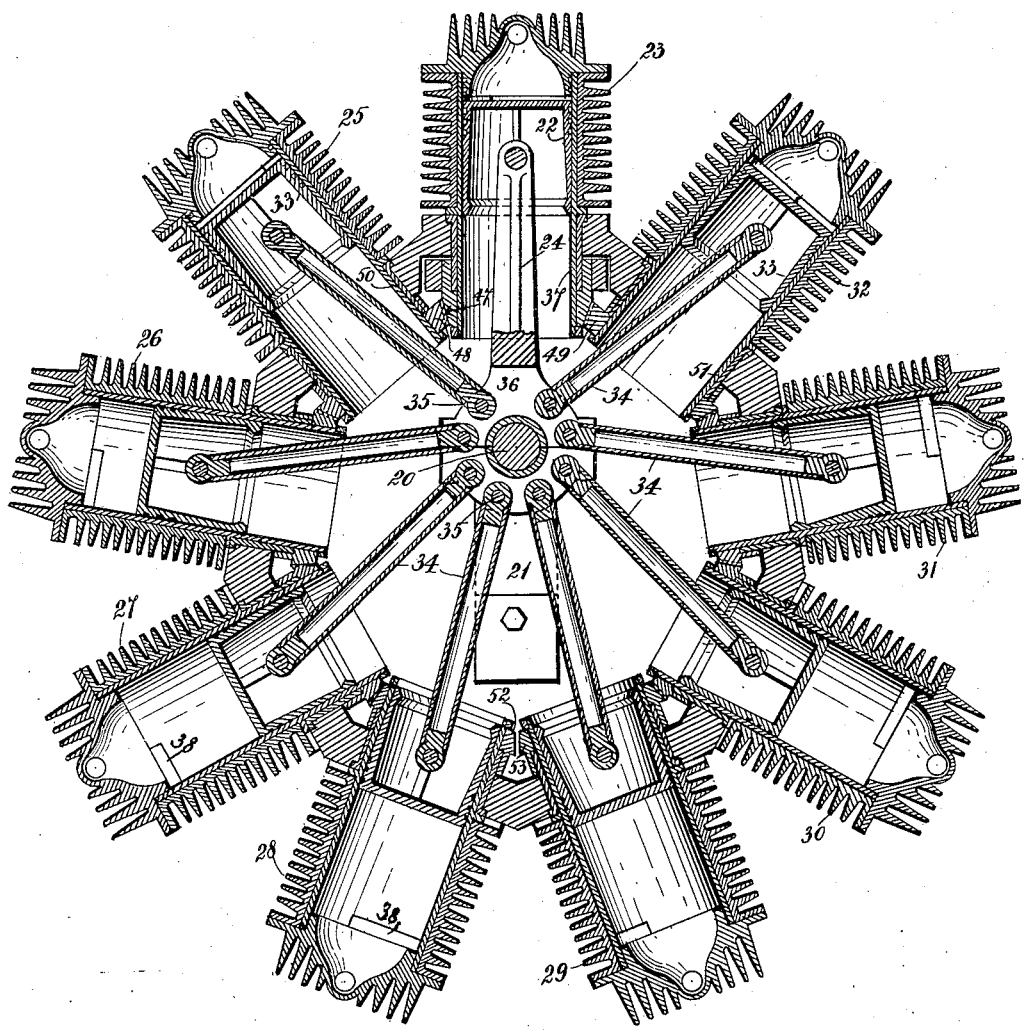
Fig. 2 is a central vertical section of all the cylinders in a plane at right angles to the power piston.
Figure 3:
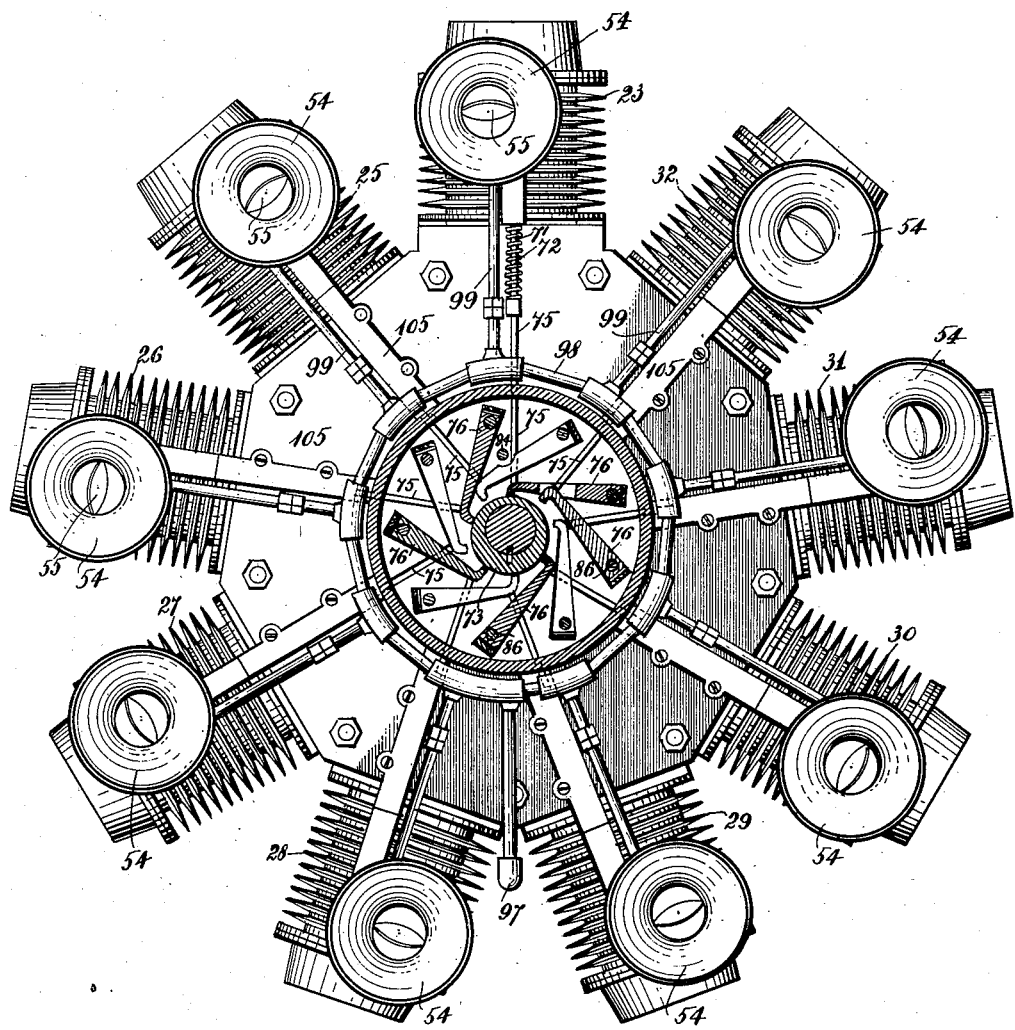
Fig. 3 is a side elevation with certain parts shown in section taken on the line 3—3 of Fig. 1.

In the particular drawings selected for more fully disclosing the principle of my invention, 20 is a crank shaft suitably journalled in the frame of the engine and provided with a balanced crank 21 which is pivotally connected with the master piston 22 in the master cylinder 23 by means of the master connecting rod 24. The other eight cylinders 25–32 are spaced around the crank shaft, as shown in Fig. 2, the angle between the centers of the two adjacent pistons being slightly less than forty degrees for a purpose hereinafter explained. The pistons 33 of cylinders 23–32, inclusive, are connected to the master connecting rod 24 by means of connecting rods 34 and pins 35, said pins passing through the bifurcated end 36 of said rod 24. Each cylinder is provided with a sleeve valve which has a port opening 38 of about one hundred degrees in length, said port opening registering at the proper times with the engine intake port 39 and exhaust port 40, each of which is about twenty degrees in length, the sleeve valve of the master cylinder being shown at 37.

Keyed to the sleeve valve of the master cylinder through the intermediary of the sleeve 41 is a spur gear 42 meshing with the pinion 43 which is keyed to the stud 44 rotated by the bevel gears 45 and 46, the latter being keyed to the crank shaft. The relation of the parts is such that the rotational speed of the sleeve 37 is one-half that of the crank shaft. The sleeve 41 is provided at its lower end with the bevel gear 47 which meshes with similar bevel gears 48 and 49 rigidly attached, respectively, to the sleeve valves 50, 51, respectively, of the cylinders 25 and 32 so that the said sleeve valves 50, 51 both rotate in the same direction but oppositely to the direction of rotation of the sleeve valve 37.

Figure 4:
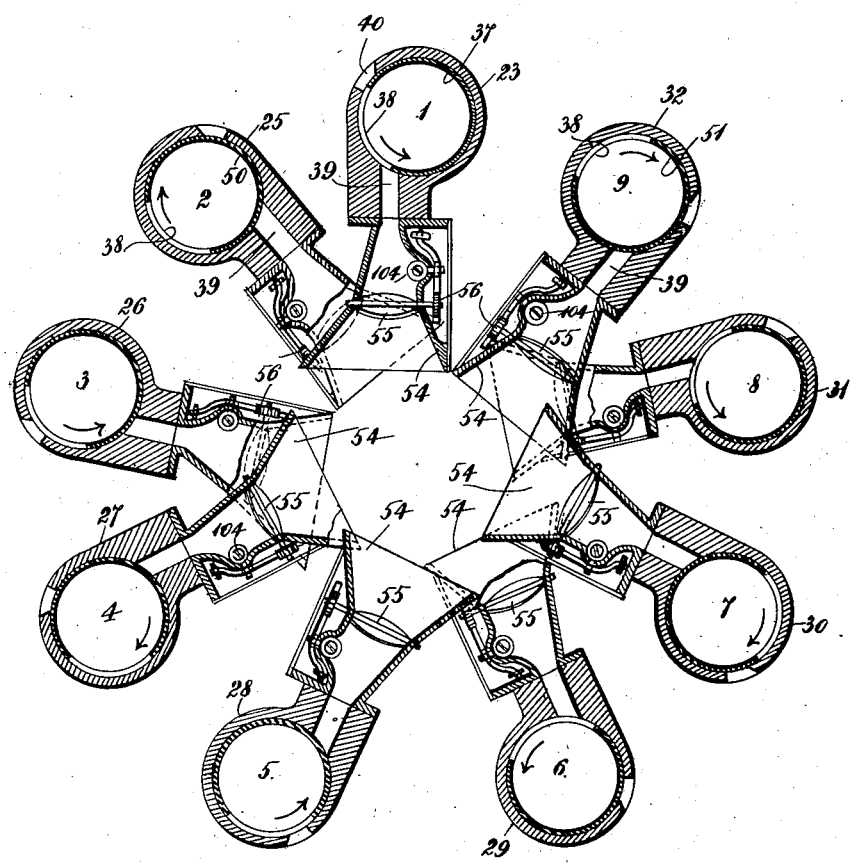
Fig. 4 is a diagrammatic view illustrating the relations between the sleeve valves and the exhaust and intake parts at the moment that the master piston in cylinder No. 1 is about to begin its mechanical suction stroke, each component part of said view being a horizontal section taken on the line 4—4 of Fig. 1.

In like manner, the bevel gears 48 and 49 mesh with similar gears on the sleeve valves of the cylinders next adjacent thereto, and so on, with the exception of the sleeve valves on cylinders 28 and 29, which sleeve valves are provided with bevel gears, each meshing with gears on the sleeve valves of the next adjacent cylinders, but not meshing with each other. In order to provide a space between the bevel gears 52, 53 attached to the sleeve valves of the cylinders 28, 29 so that said gears will not mesh with each other, the angle between the longitudinal axes of each adjacent pair of cylinders is taken at slightly less than forty degrees. The directions of rotation of the several sleeve valves, as viewed from a point above each cylinder, is indicated by the arrows in Fig. 4. The direction of rotation of the crank shaft in the present instance, from the viewpoint of a person standing at the propeller end of the engine and facing the latter, is counterclockwise.

It will be noted that each sleeve valve rotates continuously in the same direction, that the valve period is one hundred and twenty degrees, and that both the admission and exhaust valves of each cylinder are open at the same time for twenty degrees of sleeve valve travel, or forty degrees of crank shaft travel. Each intake valve registers with a cone 54 within which is housed a butterfly valve 55, secured to the axis of which is a pinion 56 meshing with the segmental rack 57 which is pivotally connected to the cone and manually controlled in any suitable manner. In the present instance, I have illustrated a rod 58 connected with the inner end of said rack 57, and having its lower end in engagement with a hole 58' in the disc 59 which in turn is attached to the pinion 60 which meshes with the rack 61, the latter being under control of the operator through the rod 62 and bell crank 63.

As will be obvious, the rotation of the propeller 64 will cause a blast of air to impinge on each cone 54 so that a quantity of air under pressure will be blown into the cylinder when the intake valve 39 is open, the amount thereof being regulatable at the will of the operator by means of the rod 62 above described. This arrangement constitutes a valuable improvement because it not only assists in scavenging, but also takes the place of a supercharger, as hereinafter more fully explained.

I prefer to so arrange matters that each admission valve opens twenty degrees early and closes forty degrees late, that is to say, opens twenty degrees before the piston reaches the upper end of its scavenging stroke and does not close until the piston has passed forty degrees beyond lower dead center on its intake stroke, and has proceeded forty degrees from lower dead center on its compression stroke. In such case the intake valve is open for two hundred and forty degrees of the crank shaft rotation and is wide open during one hundred and sixty degrees thereof. I prefer also to have the exhaust valve open forty degrees early and closed twenty degrees late, that is to say, to open forty degrees before the piston reaches lower dead center on its power stroke, and to remain open until the piston reaches a point on its intake stroke corresponding to twenty degrees past upper dead center.

It will be noted that the exhaust valve also is open for two hundred and forty degrees of crank shaft rotation, and is wide open during one hundred and sixty degrees thereof. When the valves are adjusted as aforesaid, the fuel starts to feed twenty degrees late, that is, upon the closure of the exhaust valve which, as aforesaid, takes place twenty degrees beyond upper dead center on the intake stroke, and the fuel feeding ceases forty degrees late, that is, not until the power piston has passed forty degrees beyond lower dead center on its compression stroke. The advantage of these arrangements will be hereinafter set forth.

The means whereby a mixture of liquid fuel and air is supplied to the cylinders without the use of the carburetor is as follows, it being understood of course that the particular mechanism described for accomplishing this result is merely illustrative:

Located partly within each of the cones 54 is a fuel feed pump 65 having an intake valve 66 which is controlled by the tappet rod 67, spring 68, cam 69 and tappet lever 70. The pump is provided also with a plunger 71 which is normally retracted to or toward the end of its intake stroke by the spring 72, said plunger being actuated in part by the conical cam 73 and in part by the cam 74 through the tappet rod 75 and tappet levers 76 and 84.

The cam 73 is a truncated cone bored longitudinally in a direction parallel to a generatrix thereof, the distance between which and the axis of the crank shaft on which said cone is mounted for rotation therewith, and for longitudinal adjustment with respect thereto, being equal to the maximum delivery stroke of the pump that can be effected by said cone. By means of the rod 77, lever 78 and the slide 79 having a pin-and-slot connection with said lever and engaging a circumferential slot 80 in said cone, the latter may be moved longitudinally with respect to the crank shaft to govern the stroke of the fuel pump and hence the amount of liquid fuel supplied to the cylinders.

Figure 1:
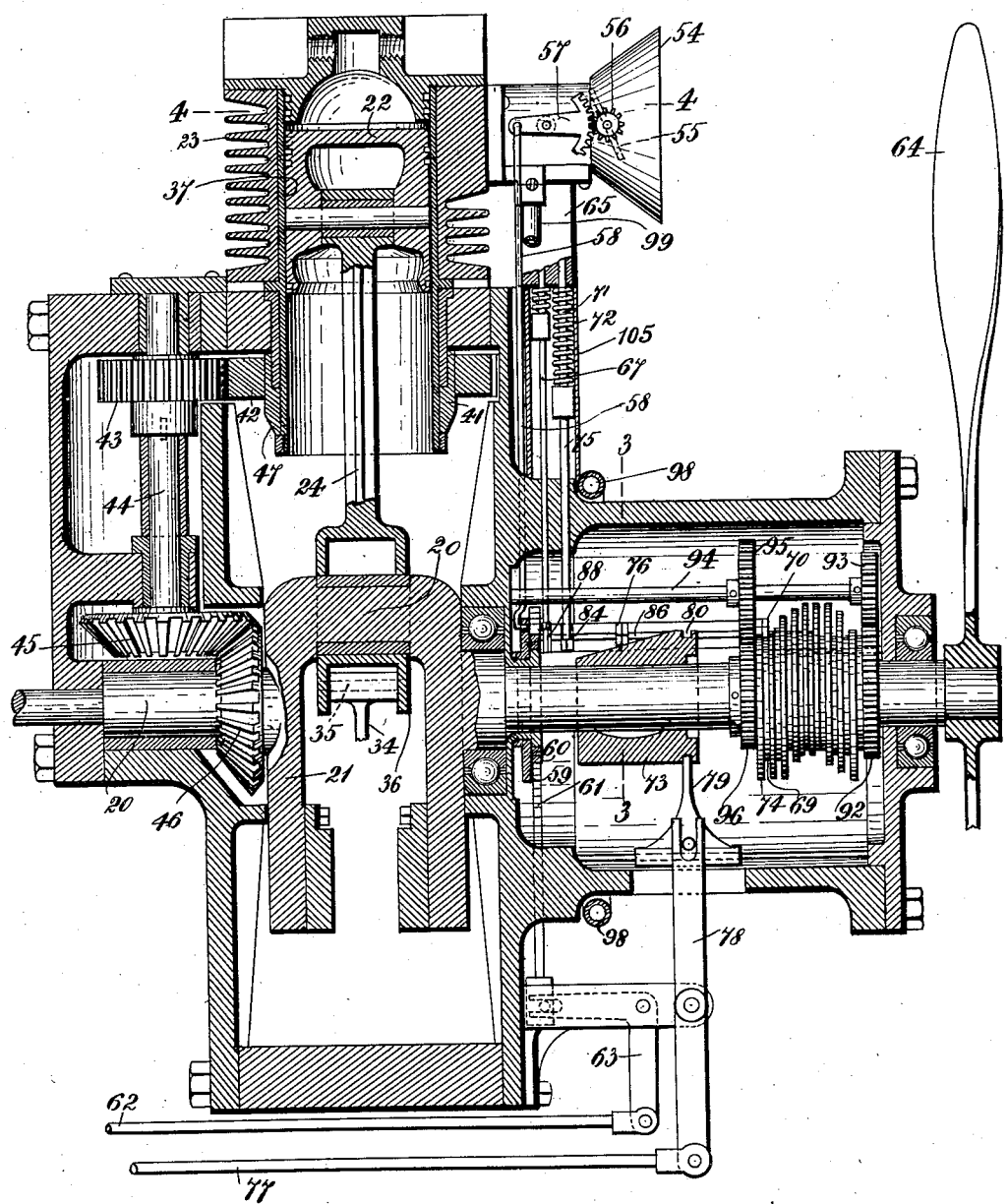
Figure 1 is a central vertical section on an enlarged scale in a plane passing through the axis of the crank shaft of the cylinder which includes the master piston, and the parts associated therewith.

When the cone is moved to its extreme righthand position, having reference to Fig. 1, the tappet levers 76, and said cone, will actuate the pump plungers at the maximum stroke that can be effected by said cone. When said levers are midway between the ends of said cone, the plungers will work at half stroke, and when said cone is moved to its extreme lefthand position, no movement at all will be imparted to the levers 76, because the section of said cam in a plane at right angles to the crank shaft at that point is a circle concentric with the crank shaft. It will be noted that the outermost position of each pump plunger at the end of its delivery stroke is independent of the longitudinal position of said cone 73. The tappet levers 76 whereby each tappet rod 75 is given an upward movement, may be constructed as shown in Fig. 8. Two U-shaped members 81, 82 are placed in the same plane and their abutting portions riveted together as shown at 83, such central portion comprising the tappet lever 76 and normally maintained against the cone 73 by the spring 72. The lower end of the tappet rod 75 rests on the outer end of the arm 84 of the U-shaped member 81 so that the motion imparted to the arm 76 will be transmitted to the tappet rod 75. The arm 85 of the righthand U-shaped member 82 is disposed within the pathway of the cam 74 in order to give the pump plungers additional movement after the conical cam 73 has imparted to the same the maximum movement possible for any particular setting of said conical cam. The cams 74 are so shaped that not only is the above mentioned additional movement imparted to the pump plungers, but each said plunger is held at the end of its delivery stroke during the greater portion of the compression stroke of the power piston and during the entire power stroke of the latter.

Mounted about the shaft 86 which carries the tappet levers 76 is a U-shaped member 87 comprising the arm 88 on which rests the tappet rod 67 which actuates the intake valve of the fuel pump, and the arm 70, the outer end of which is disposed within the pathway of the cam 69, the said cams 69 and 74 being arranged alternately on the crank shaft and held against mutual relative movement by the pins 89 passing through the holes 90, 91 and threaded into the gear 92, the latter meshing with pinion 93 which has one-half the pitch of gear 92 and is mounted to rotate with the shaft 94, the latter in turn being rotated by the crank shaft through the gearing 95, 96. The arrangement is such that the spring 68 normally presses the tappet rod 67 against the outer end of the arm 88, and thereby maintains the intake valve 66 of the pump on its seat until the plunger 71 begins its suction stroke whereupon, and until the completion thereof, said valve 66 is maintained off its seat. The pipe 97 conducts the fuel supply from a source (not shown) to the circular pipe 98 from which radiate pipes 99 to the intake ports of each fuel pump. Upon the inward stroke of the plunger 71, the valve 66 being off its seat, a charge of liquid fuel passes through the port 100 into the pump barrel 101, and upon the outward or delivery stroke, the valve 66 being closed, said fuel forces the check valve 102 from its seat and is sprayed into the cones 54 through the port 103 which is suitably constructed to facilitate the fine sub-division of the fuel in any approved and well known manner. The housing of the check valve 102 which is provided with the outlet port 103 is enclosed within the cone 54. Preferably the tappet rods 67, 75 and their accessories are enclosed within the casings 105 in order to protect them from sleet and snow.

The operation is as follows: When a piston is at upper dead center and is about to begin its intake stroke, the intake valve 39 has been partly uncovered by the port 38, and the exhaust valve 40 is partly open, as will be evident from the position of the parts in No. 1 cylinder indicated in Fig. 4. As above stated, the intake and exhaust valves are open at the same time for forty degrees of crank shaft travel, and during this time, fresh air is being blown through the combustion chamber of the cylinder by the propeller 64, thereby ensuring perfect and complete scavenging.

At twenty degrees from upper dead center on the intake stroke, the exhaust valve closes and the intake valve is fully open. At this point, the fuel pump commences its delivery stroke and atomized fuel is forced from the port 103 into the cone 54, while at the same time, air under pressure is forced into said cone by the propeller, and by the combined action of the suction created by the piston on its intake stroke and the blast of air forced into said cone by the propeller, the charge is forced into the combustion chamber. The intake valve remains wide open for one hundred and sixty degrees of crank shaft rotation, whereupon it begins to close, and is completely closed forty degrees beyond lower dead center, at which time the pump plunger has reached the end of its delivery stroke where it remains through the action of the cam 74 during the remaining portion of the compression stroke and during the entire power stroke.

The pump plunger acts in a synchronism with the engine piston during the first portion of the intake stroke of the latter and is actuated during the remaining portion of said intake stroke in substantial accordance with the rate of speed of the air influx. Therefore, the ratio of the rate of the influx of liquid fuel to the rate of the influx of the air of combustion is maintained substantially constant when the air intake valve is open while the engine is under load. When the piston has completed about one-half of its intake stroke, the influx of air has attained its maximum velocity and has acquired considerable momentum, by virtue of which it continues to flow into the cylinder at a rate of speed higher than that corresponding to the movement of the piston. Therefore, I have provided the supplemental cams 74 co-operating with the tappet arms 85 for completing the delivery stroke of the pump plunger in substantial accordance with the rate of speed of the air influx, such supplemental cam coming into engagement with the tappet arm 85 at about the time that the conical cam 73 has given its co-operating tappet arm 76 the maximum motion possible.

By the foregoing arrangements, the supply of liquid fuel is varied according to the engine load and the ratio of the rate of influx of liquid fuel to the rate of the influx of air of combustion is maintained practically constant when the air intake valve is open under such variations of load as would be encountered in driving an airplane.

Continued rotation of the crank shaft causes the piston to rise and complete its compression stroke, whereupon ignition occurs and the power stroke ensues. When the piston reaches a point about forty degrees ahead of lower dead center on its power stroke, the port 38 begins to uncover the exhaust port 40 which, as above stated, remains open during the scavenging stroke and until the piston has passed upper dead center and has reached a point twenty degrees beyond the same, whereupon the exhaust valve closes. When the piston on its scavenging stroke reaches a point twenty degrees before upper dead center, the intake valve begins to open, and from that point until the closure of the exhaust valve, stated above as twenty degrees beyond upper dead center, this period being forty degrees of crank shaft rotation, there is an open passage from the cone 54 to the intake valve, the combustion chamber and the exhaust valve, through which passage for the period above mentioned, fresh air is forced through the combustion chamber to complete the scavenging thereof.

It will be obvious from the foregoing that by means of my invention the power of an airplane engine per unit of weight is greatly increased, and the engine rendered more reliable in action.

Inasmuch as the principle underlying my invention may be embodied in a variety of structures, I do not limit myself to the particular arrangements herein specifically described.

I claim:—

1. An internal combustion engine comprising in combination a crank shaft, a plurality of cylinders radially disposed about said shaft, each cylinder being provided with an air intake port and with an exhaust port, means actuated by said shaft for creating a current of air impinging upon each said intake port, means for opening said exhaust port and maintaining the same open during the scavenging stroke and for opening said intake port during the latter portion of the scavenging stroke, and manually-actuated means for simultaneously controlling the influx of air into each cylinder.

2. An internal combustion engine comprising in combination a crank shaft, a plurality of cylinders radially disposed about said shaft, a fuel feed pump associated with each said cylinder, a conical cam driven by said shaft, means connecting each said pump for actuation by said cam, and a plurality of cams, one for each said cylinder, for controlling the operation of each said pump.

3. An internal combustion engine comprising in combination a crank shaft, a plurality of cylinders radially disposed about said shaft, a fuel feed pump associated with each said cylinder, a conical cam mounted on and rotated by said shaft, a plurality of cams, one for each said pump mounted on, but freely rotatable with respect to, said shaft, means for driving the last mentioned cams at lower speed than said shaft, a plurality of pairs of tappet levers, means connecting the members of each said pair of tappet levers rigidly together, one of said arms of each pair of tappet levers being actuated by said conical cam, and the other of said arms of each said pair of tappet levers being actuated by said cams, respectively, and means connecting each of said pair of tappet levers with said pumps, respectively.

4. An internal combustion engine comprising in combination a crank shaft, a plurality of cylinders radially disposed about said shaft, a plurality of fuel feed pumps associated with each said cylinder, an intake valve for each of said pumps, means driven by said shaft for actuating said pumps, a plurality of cams mounted on, but rotatable with respect to, said shaft, means for driving said cams at lower speed than said shaft, a plurality of tappet levers each actuated by one of said cams, and means mechanically connecting said tappet levers, respectively, with the intake valves of each said fuel pump.

5. In an internal combustion engine, an air inlet valve and a fuel pump for each cylinder of the engine, said fuel pump being mechanically driven so as to maintain a substantially constant ratio between the weight of air and weight of fuel supplied to the engine cylinder and having a spray nozzle arranged to spray fuel so as to intersect the current of air just before the latter passes through the intake valve into the cylinder of the engine.

In testimony whereof, I have hereunto subscribed my name this 28th day of September, 1928.

HENRY H. CUTLER.